(12) United States Patent
Bordin

(10) Patent No.: US 8,905,329 B2
(45) Date of Patent: Dec. 9, 2014

(54) METHOD AND DEVICE FOR SPRAYING MIXTURES OBTAINED FROM THE REACTION OF POLYMER MATERIALS

(75) Inventor: Ettore Bordin, Altivole (IT)

(73) Assignee: Stemma Srl, Altivole (Treviso) (IT)

( * ) Notice: Subject to any disclaimer, the term of this patent is extended or adjusted under 35 U.S.C. 154(b) by 422 days.

(21) Appl. No.: 13/123,998

(22) PCT Filed: Oct. 12, 2009

(86) PCT No.: PCT/IB2009/054466
§ 371 (c)(1), (2), (4) Date: Apr. 13, 2011

(87) PCT Pub. No.: WO2010/044046
PCT Pub. Date: Apr. 22, 2010

(65) Prior Publication Data
US 2011/0200758 A1    Aug. 18, 2011

(30) Foreign Application Priority Data

Oct. 14, 2008    (IT) .................................. TV08A0127

(51) Int. Cl.
*B05B 1/28*    (2006.01)
*B29B 7/42*    (2006.01)
*B29C 41/36*    (2006.01)
*B29B 7/80*    (2006.01)
*B29B 7/74*    (2006.01)
*B05B 7/06*    (2006.01)
*B05B 7/04*    (2006.01)

(52) U.S. Cl.
CPC ................. *B29B 7/42* (2013.01); *B29C 41/365* (2013.01); *B29B 7/424* (2013.01); *B05B 7/0408* (2013.01); *B29B 7/805* (2013.01); *B29B 7/7442* (2013.01); *B05B 7/067* (2013.01)
USPC ........ 239/292; 239/298; 239/403; 222/145.6; 222/413; 366/88

(58) Field of Classification Search
CPC ........ B05B 7/067; B05B 7/0408; B29B 7/42; B29B 7/424; B29B 7/7442; B29B 7/805
USPC ............... 239/292, 298, 403; 222/145.6, 412, 222/413; 422/133; 366/88
See application file for complete search history.

(56) References Cited

U.S. PATENT DOCUMENTS 3,035,775 A    5/1962    Edwards et al.
3,123,306 A *  3/1964    Bradley et al. ................ 239/142

(Continued)

FOREIGN PATENT DOCUMENTS

EP    0209888 A    1/1987
EP    0307562 A    3/1989

OTHER PUBLICATIONS

"PCT International Search Report dated Jan. 26, 2010 for PCT/IB2009/054466, from which the instant application is based," 3 pgs.

*Primary Examiner* — Dinh Q Nguyen
(74) *Attorney, Agent, or Firm* — Fredrikson & Byron, P.A.

(57) ABSTRACT

A method and a device for producing a thin article or a thin coating on a previously manufactured solid body. At least two reactive polymer materials are mixed together thoroughly and die resultant mixture is discharged via a nozzle in the form of a thin tube. This thin tube is pulverized or atomized by means of the introduction of a controlled flow of pressurized air with the result that die pulverized mixture may be sprayed onto an open mold or onto a surface or onto a previously manufactured solid body which is to be coated.

10 Claims, 9 Drawing Sheets

(56) References Cited

U.S. PATENT DOCUMENTS

| | | |
|---|---|---|
| 3,304,010 A | 2/1967 | Cantrell et al. |
| 3,306,540 A | 2/1967 | Reichert et al. |
| 3,752,449 A * | 8/1973 | Schwab et al. ............ 366/88 |
| 4,778,659 A | 10/1988 | Inoue |
| 6,126,039 A * | 10/2000 | Cline et al. ............ 222/63 |
| 6,572,031 B2 * | 6/2003 | Hunter et al. ............ 239/290 |
| 7,621,465 B2 * | 11/2009 | Riney ............ 239/298 |
| 2002/0153433 A1 | 10/2002 | Hunter |

* cited by examiner

METHOD AND DEVICE FOR SPRAYING MIXTURES OBTAINED FROM THE REACTION OF POLYMER MATERIALS

RELATED APPLICATIONS

This application is a 35 U.S.C. 371 national stage filing from International Application No. PCT/IB2009/054466 filed Oct. 12, 2009 and claims priority to Italian Application No. TV2008A000127 filed Oct. 14, 2008, the teachings of which are incorporated herein by reference.

FIELD(S) OF THE INVENTION

The present invention relates to a method and a device for spraying mixtures of reactive polymer materials, for example bi-component or multi-component polyurethanes, in order to obtain thin articles, i.e. articles with a small thickness, and to apply a thin coating onto previously manufactured solid bodies.

BACKGROUND

In the context of the present patent:
"spraying" refers to the use of pulverized (atomized) liquid mixtures;
the term "articles" is understood as meaning both finished products and components and semi-finished articles used to produce finished products;
"thin", both in the case of articles and in the case of coatings, refers to a thickness which may be even less than one millimeter and in practice is between 0.1 and 4 mm;
"high definition" refers to the possibility of reproducing very fine designs or textures.

The conventional techniques for producing articles using basic components consisting of reactive polymer materials in the form of very viscous fluids as well as any auxiliary filler materials such as coloured pigments, flame retardants, etc., employ devices such as those described, for example, in the U.S. Pat. No. 3,035,775. In this device the basic components are thoroughly mixed together and pressurized air is added to the resultant reaction product (polymer mixture) so that it can be sprayed through an end nozzle.

These techniques are undoubtedly satisfactory, as demonstrated by their widespread use, but they have a number of important limitations with regard to the production of thin articles or coatings with very small and well-defined designs. In this case it is required to use spraying devices which ensure very small flowrates and which therefore have an end nozzle with a very small cross-section. A nozzle of this kind, however, becomes blocked very rapidly owing to the viscosity and reactivity of the basic components of the polymer mixture.

The device described in the U.S. Pat. No. 4,778,659 (corresponding to EP 0,209,888) comprises a splined shaft which is rotated at a speed of between 100 and 3200 rpm so as to receive sequentially and mix two reactive polymer liquids. The device comprises an outlet opening with substantially the same diameter as the shaft, through which the resultant reaction product, i.e. the polymer mixture, is discharged without being pulverized (atomized), and therefore this device is not a spraying device.

BRIEF SUMMARY OF EMBODIMENTS OF THE INVENTION

The main object of the present invention is to provide a method and a device for spraying mixtures of liquid polymer materials with a high viscosity and high reactivity so as to achieve the following results:

the articles thus obtained (the word "article" having the meaning as defined above) have mechanical properties such that they do not require in all cases a reinforcing substrate in order to be used;
both the articles and the coatings thus produced have a minimum thickness of less than 1 mm and a thickness on average of between 0.1 and 4 mm;
both the articles and the coatings may be high-definition, i.e. have a surface with very pronounced textures and with well-defined edges, allowing also very fine designs to be reproduced. This means that on the surface of articles and coatings it is possible to obtain clear writing which is legible by the naked eye even in the case of a minimum height of 5 American typographical points or Postscript, namely about 1.75 mm;
both the articles and the coatings are without the typical defects of articles produced with polyurethane mixtures, such as air pockets or cavities resulting therefrom.

The invention is able to achieve this object and other objects by imparting to the reaction product (polymer mixture with at least two basic components) a tube-like form with a thickness of less than 1 millimeter and pulverizing or atomizing this tube the instant it emerges from the device inside which the basic components are thoroughly mixed together.

BRIEF DESCRIPTIONS OF THE DRAWINGS

These characteristic features and the associated advantages will emerge more clearly from the following description of a non-exclusive embodiment of the present invention, with reference to the accompanying drawings, in which.

DETAILED DESCRIPTION OF THE EMBODIMENTS OF THE INVENTION

Figure 1:
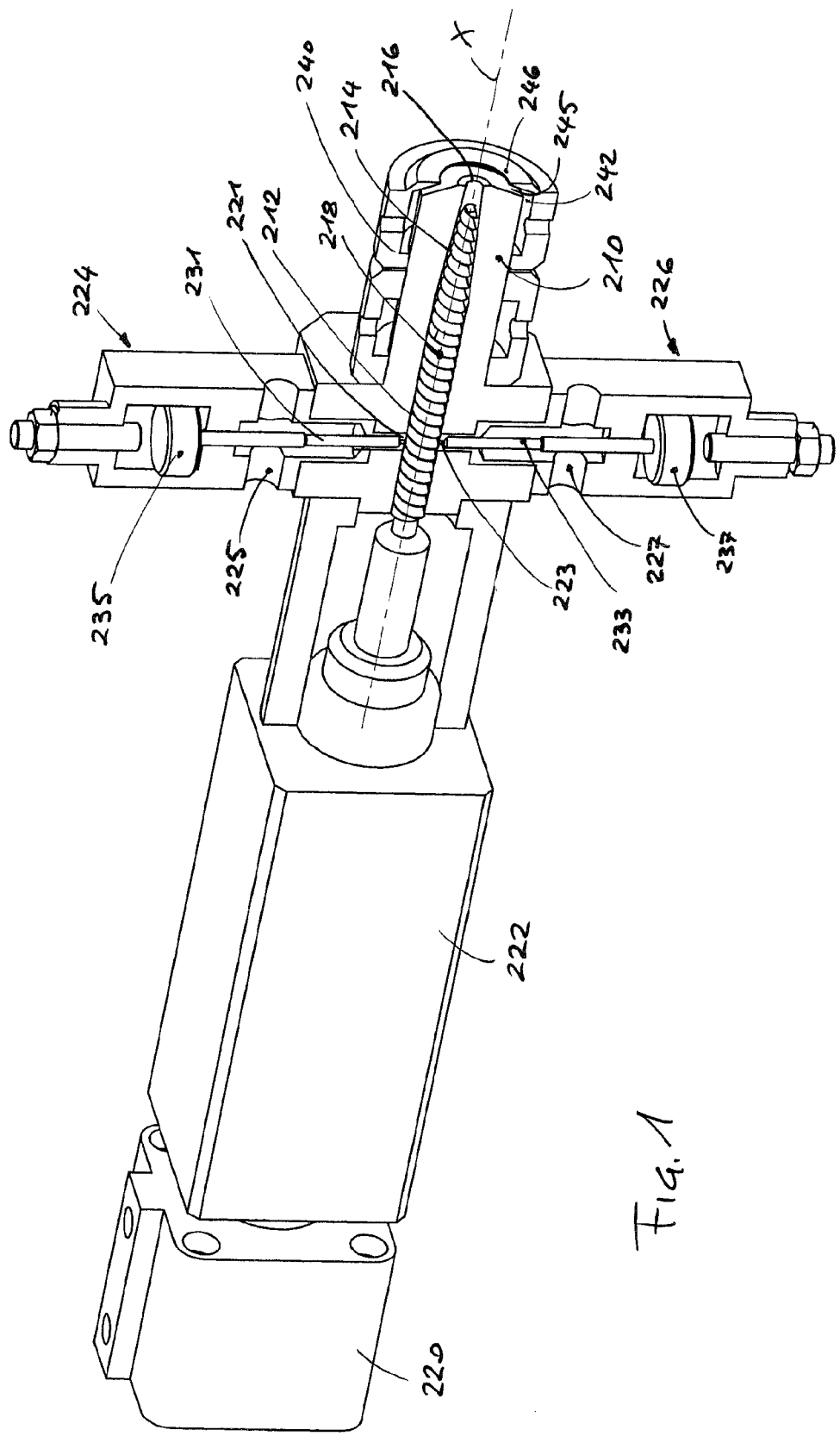
FIG. 1 shows a three-dimensional and partly sectioned view of a device according to the invention for spraying polyurethane obtained by mixing basic components consisting of polyol and isocyanate (with any required additives)

With particular reference to FIG. 1, the device according to the invention comprises in a manner known per se an elongated casing 210 which encloses a first cylindrical chamber 212 and, in succession along the same axis X, a second frustoconical chamber 214 which terminates in a spraying nozzle 216. A helical-profile screw 218 operates inside the chambers 212 and 214 and is able to rotate about its axis at a variable, but very high speed, ranging between 8000 and 30,000 rpm, so as to mix the reactive components and to move in both directions along the same axis until it emerges partially from the nozzle so as to clean it of any remains of the resultant mixture. The end part of the screw 218 has in fact a diameter which decreases, like the second chamber 214 of the casing 210, to a minimum value equal to the value of the diameter of the nozzle 216. For operation of the screw 218, the device comprises, respectively, also an electric motor 220 and a cylinder unit 222.

Figure 2:
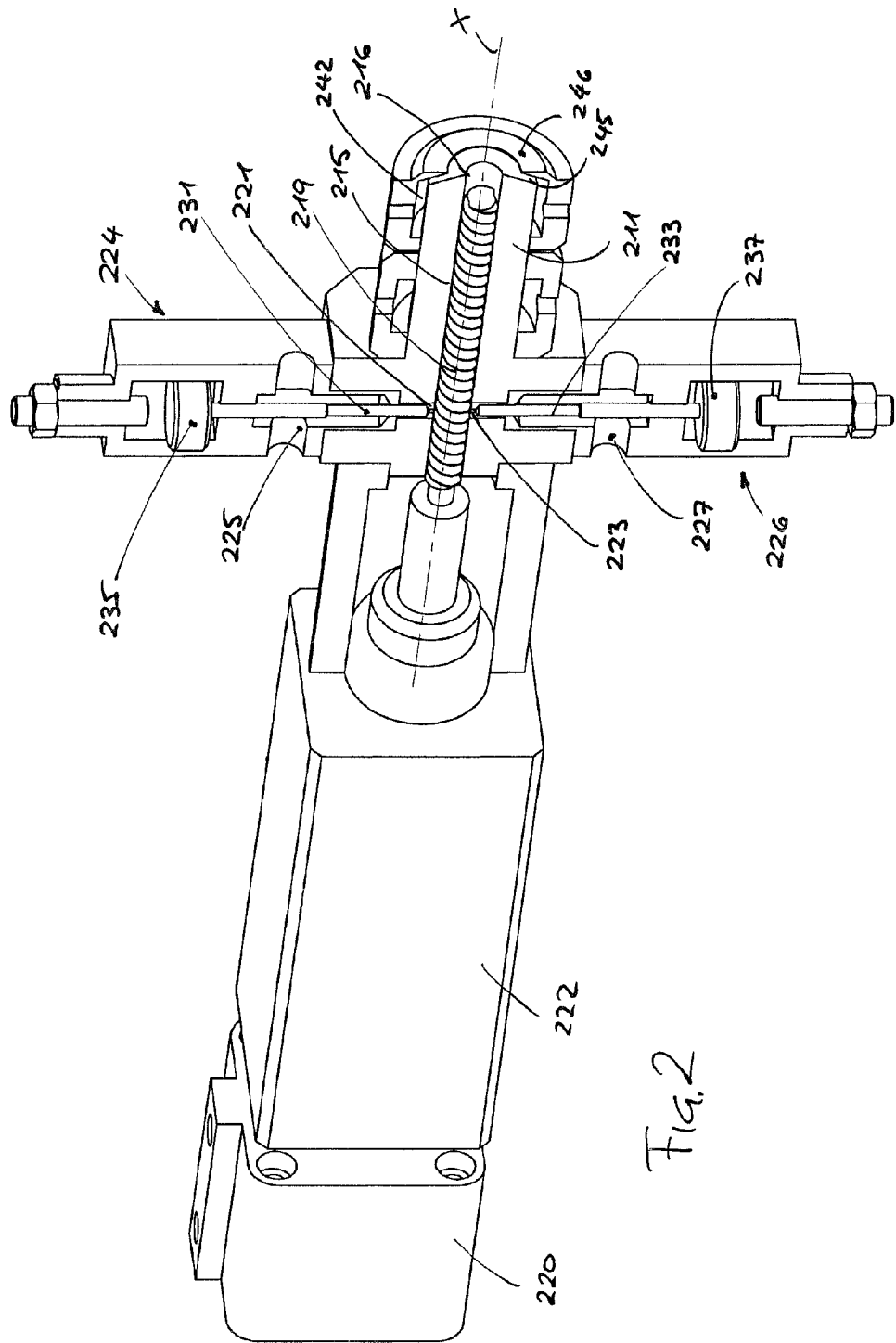
FIG. 2 shows a variant of the device according to FIG. 1.

The variant shown in FIG. 2 differs from the device according to FIG. 1 only in that the elongated housing 211 encloses a single cylindrical chamber 215 inside which a mixing screw 219, which is also cylindrical, operates. The other parts of this device are the same as those shown in FIG. 1 and therefore retain the same reference numbers.

As mentioned hereinabove, up to this point in the description, the device is conventional, while the characteristic features described from this point onwards are regarded as novel and original, at least in terms of their combination, in that as a result it is possible to achieve results, described more fully below, which cannot be achieved by the state of the art.

Figure 4:
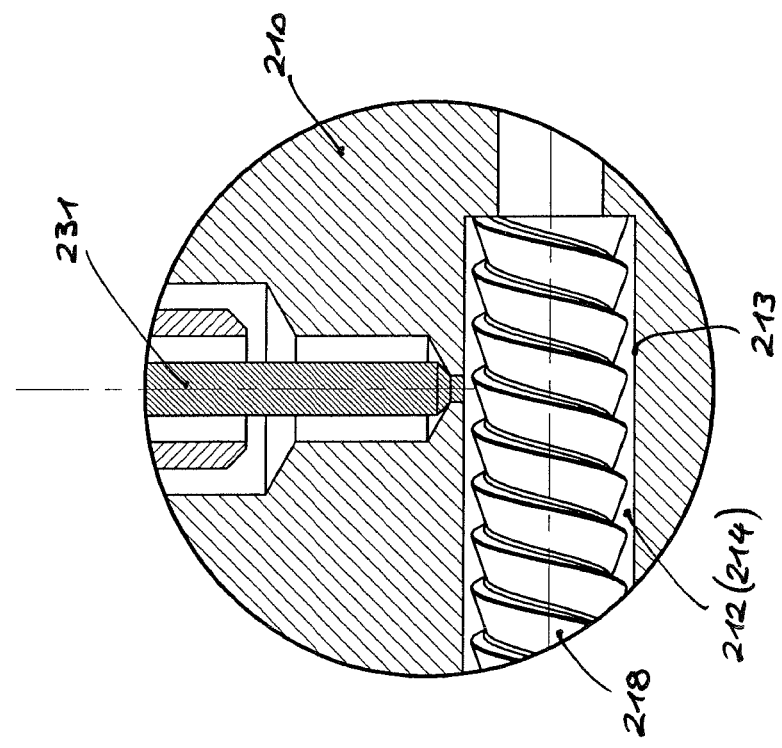
FIGS. 3 and 4 show, on a larger scale, the two configurations (open configuration and closed configuration, respectively) of one of the valves by means of which the abovementioned basic components are supplied to the device.
Figure 3:
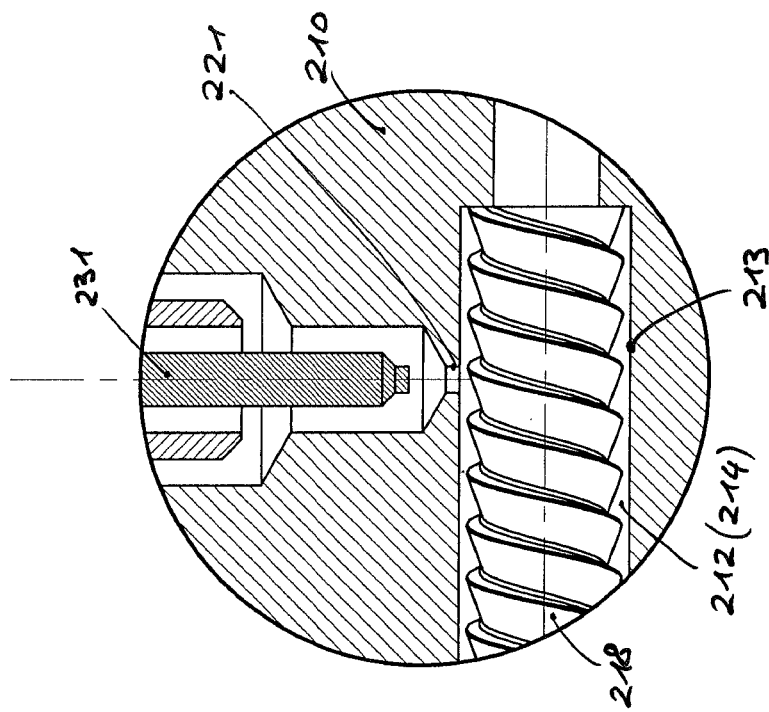

A first characteristic feature of the present invention, illustrated by the enlarged views in FIGS. 3 and 4, is that the along the whole length of the mixing screw 218 the clearance between the crest of its helical profile and the surface 213 of the chambers 212 and 214 is constant and has a value of less than 1 millimeter, and preferably a value of between 0.08 and 0.3 millimeters. The same clearance also exists between the mixing screw 219 and the surface 217 of the chamber 215 in the variant of the invention shown in FIG. 2.

A second characteristic feature relates to the two one-way metering valves 224 and 226. The valves receive the basic components in the liquid state (A=polyol and B=isocyanate when the mixture M is polyurethane) via inlet channels 225 and 227 which communicate with respective storage tanks (not shown) and introduce these basic components into the first chamber 212 via respective radial supply channels or openings 221 and 223 which are arranged on the surface 213 of the chamber 212. The metering valves 224 and 226 are proper injectors comprising injection needles 231, 233 which interact with the supply openings 221 and 223 and are operated in an adjustable manner by respective solenoids 235, 237 or other conventional means so as to obtain very low values, ranging between 0.05 and 8 grammes per second of the resultant mixture.

A third characteristic feature, already mentioned hereinabove, is that the end diameter, i.e. in front of the nozzle 216 of the mixing screw 218 (or, respectively, the sole diameter of the screw 219) is the same as the diameter of the said nozzle 216 and ranges between 6 and 15 millimeters—see FIG. 6.

Figure 6:
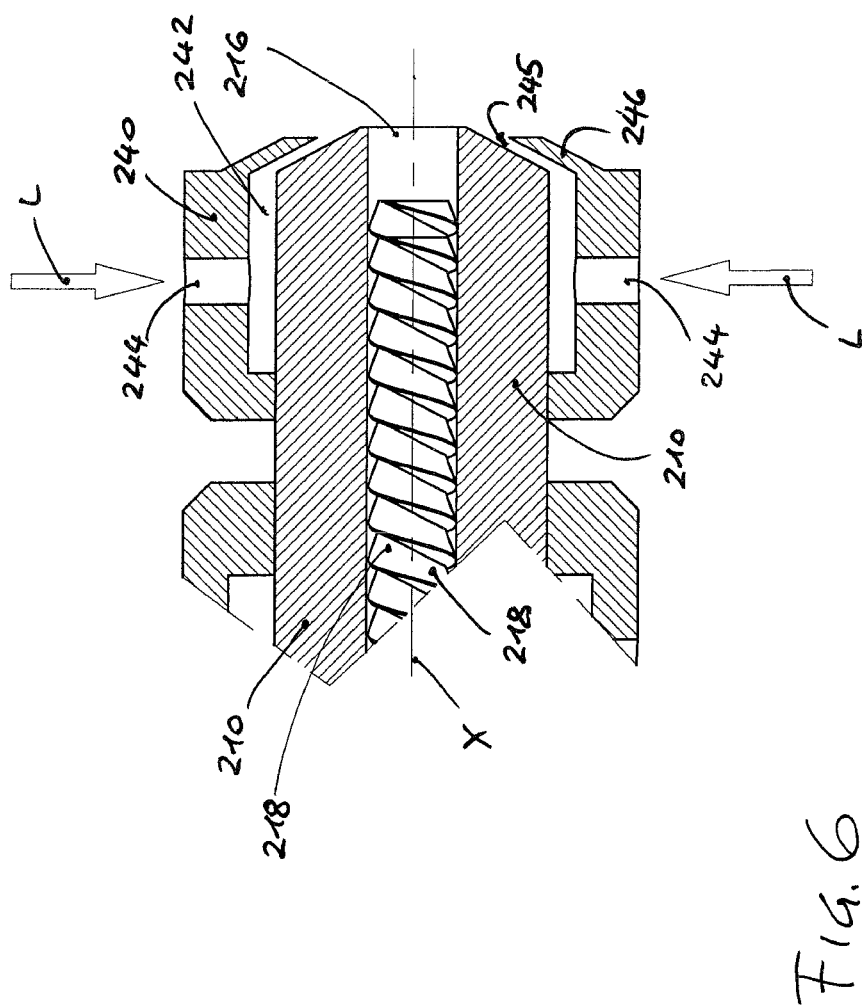
FIG. 6 shows an enlarged view of the part of the device where pressurized air is blown onto the mixture.

A fourth characteristic feature, which is illustrated in the enlarged view of FIG. 6, consists in the configuration of the end part of the device according to the present invention, i.e. the mixture is pulverized (atomized) with the local introduction of pressurized air so as to be sprayed. The pressurized air reaches, in fact, via a plurality of openings 244 (as indicated by the arrows L), a ring 240 which surrounds the end part of the elongated casing 210 (or 211, respectively) with a calibrated radial clearance 242 and has a head 246 with a front clearance 245 which is also calibrated. With continued reference to FIG. 6, the radial clearance 242 is defined as a gap between the ring 240 and end part of the casing 210 (or 211), with such gap connecting the openings 244 and the front clearance 245. The position of the ring 240 is adjustable along the axis of rotation X of the mixing screw 218 (or 219, respectively). As shown by FIG. 6, adjustment in position of the ring 240 along the axis of rotation X of the mixing screw 218 (or 219) varies size of the front clearance 245, so as to vary the pressure of the air which emerges from the front clearance 245 of the ring 240 exactly at the end of the nozzle 216.

Figure 5:
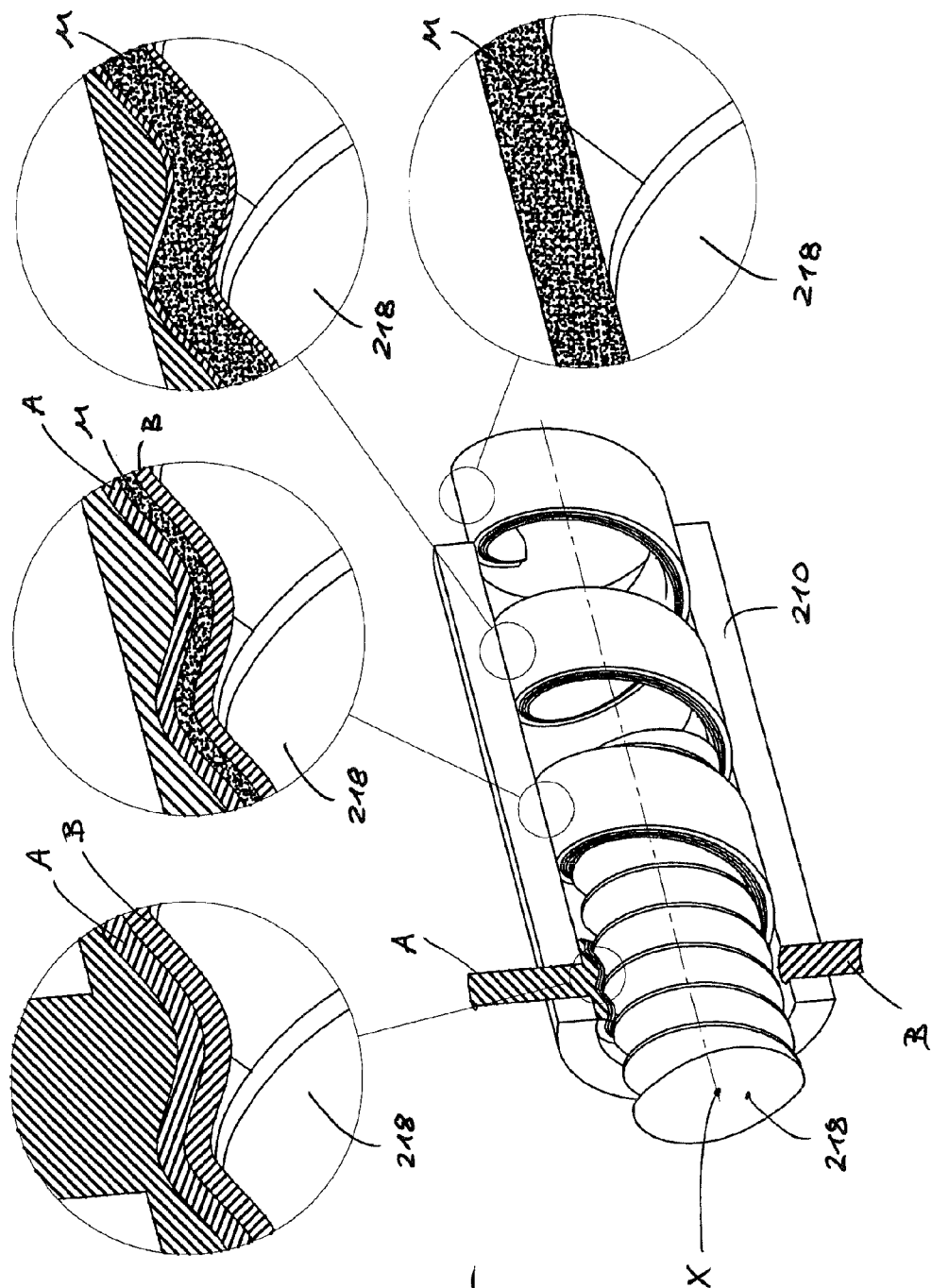
FIG. 5 shows in schematic form, with certain details enlarged, how the aforementioned basic components are mixed inside the device, resulting in a tube-like form of the mixture produced.

As a result of the characteristics features described above, in a device according to the invention, the very small clearance between mixing screw 218 and inner surface 213 of the corresponding chamber 212 inside the elongated casing 210 produces laminar flows of the basic components A and B which are gradually mixed and react producing the mixture M. In the chamber zone closest to the nozzle 216 the mixture therefore assumes the form of a very thin tube 250, i.e. with a thickness not greater than 1 millimeter and a diameter substantially the same as the end (or sole) diameter of the mixing screw 218 (219)—see in particular the enlarged details of FIG. 5. In this way the flowrate of the mixture discharged via the nozzle 216 has very small values (between 0.05 and 8 grammes per second) already mentioned hereinabove.

Figure 7:
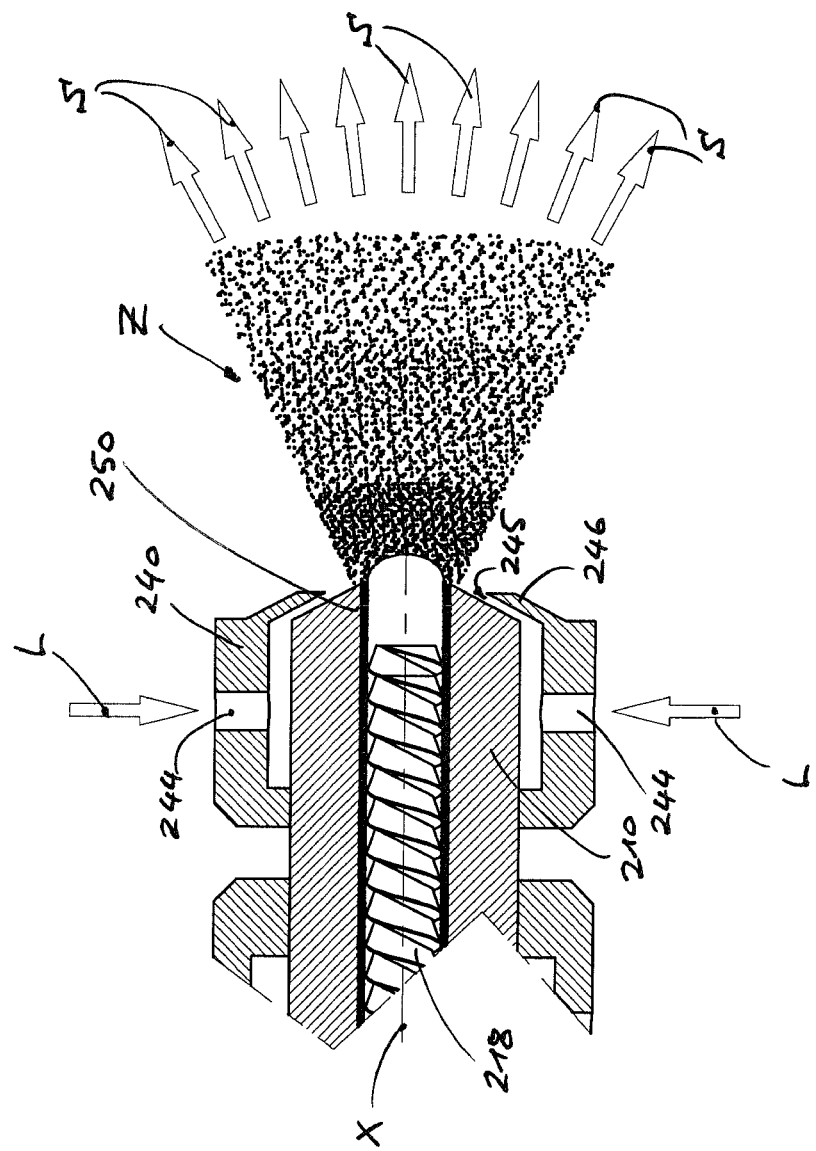
FIG. 7 shows how, in the same zone shown in FIG. 6, the mixture is imparted a tube-like form at the moment when it is pulverized (atomized) and therefore sprayed by the pressurized air.

This tube 250 is pulverized or atomized by the pressurized air which emerges from the front clearance 245 of the ring 240 and the mixture M may therefore be sprayed, as indicated schematically by the fan-like form Z in FIG. 7. The amplitude or "range" of the sprayed mixture M, indicated by the arrows S in the same FIG. 7, may be varied by adjusting the pressure of the air which emerges from the front clearance 245 of the ring 240.

FIGS. 8, 9, 10A and 10B show different ways of spraying the mixture. These figures show, in an entirely schematic form, a device according to the present invention, indicated by D, and the fan-like spray Z of the mixture M produced by it.

Figure 8:
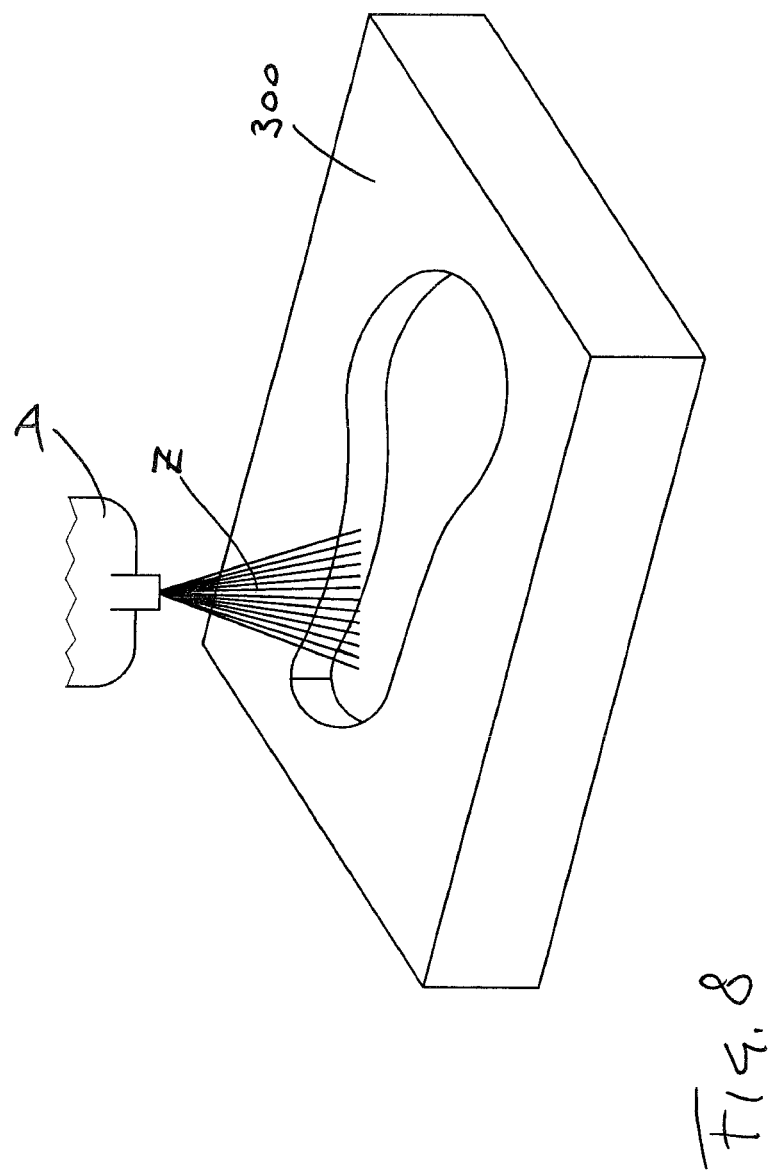
FIGS. 8, 9, 10A and 10B show different modes of use of the present invention.
Figure 9:
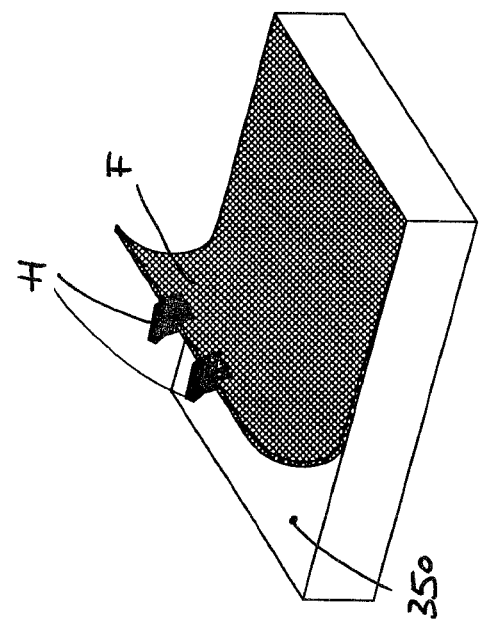
Figure 9:
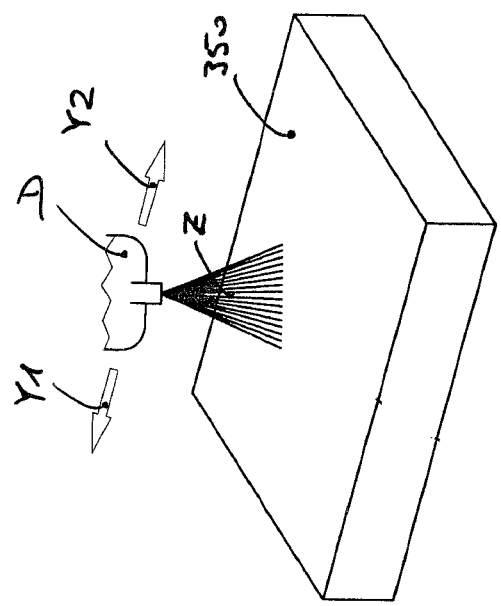
Figure 10B:
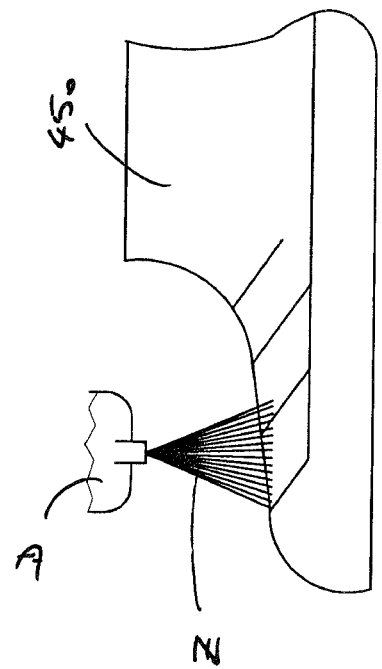
Figure 10A:
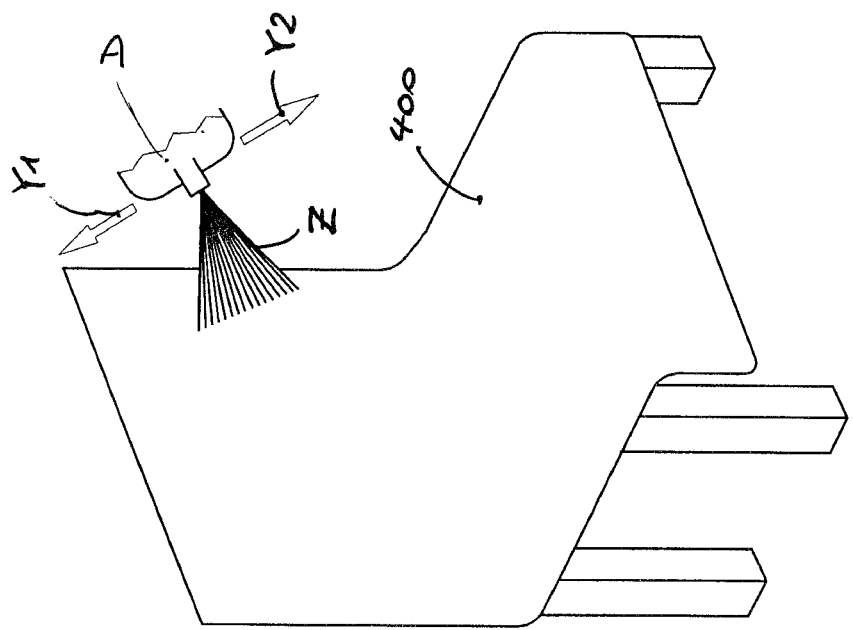

As a result of the invention, in fact, it is possible to obtain an article with a minimum thickness of 0.1 millimeter, reproducing a design with a very fine texture:

both when this design is present on an open three-dimensional mould 300 (for example that of a shoe sole, see FIG. 8);

and when the design is present on a flat surface 350, so as to obtain a "printed" sheet F (see FIG. 9 which, in the right-hand drawing, illustrates the moment when it is detached from the surface 350, schematically represented by the hands H. In this case, during spraying, a relative movement may be required, schematically indicated by the arrows Y1 and Y2, of the device D and the surface 350 in order for the latter to be fully and uniformly covered);

or in order to obtain a coating, also with a minimum thickness of 0.1 millimeters, of a three-dimensional body manufactured previously, for example a chair 410, see FIG. 10A (in this case also a relative movement of the device D and the chair 400, schematically indicated by the arrows Y1 and Y2, may be required) or a sports shoe—see FIG. 10B.

A further characteristic feature of a device according to the invention consists in the use of a helical profile of the mixing screw 218 (or screw 219, respectively) of the multiple-thread type. A profile of this type has two or more valleys (not shown) which are parallel and arranged symmetrically with respect to the axis of rotation of the screw so as not affect the dynamic balance of the said screw. This fifth characteristic feature, however, is not indispensable for achieving the desired results, in contrast to the four characteristic features previously described.

From the above description it can be understood that the abovementioned objects are achieved and that the nozzle becomes blocked very rarely, if at all, since its diameter is the same as the diameter of the mixing screw or at least its end part.

Within the scope of the following claims, the method and the device according to the present invention may also be realized in ways different from those described hereinabove.

The invention claimed is:

1. Spraying device comprising:
   a casing enclosing at least one chamber having a nozzle at one end;
   radial openings or channels for feeding reactive basic components in a fluid state of a polymer mixture, said openings or channels being provided on a surface of said at least one chamber, whereby said basic components contain additives depending on the application or use of the mixture;
   a mixing screw with a helical profile extending along the axis of said at least one chamber;
   means for operating the mixing screw so as to cause it to rotate about said axis and move linearly along the axis;
   wherein an end diameter of the mixing screw in front of the nozzle is same as diameter of the nozzle;
   a ring comprising a free head encircles with a calibrated radial clearance a portion of the one end of the casing and has a position adjustable along axis of rotation of the mixing screw, the ring being provided with openings for introducing pressurized air onto mixture discharged by the nozzle through a front clearance and being calibrated so as to pulverize or atomize the mixture so that it can be sprayed;
   clearance between an inner surface of the at least one chamber of the casing and crest of the helical profile of the mixing screw is constant and has a value of less than 1 millimeter; and
   further comprising metering valves for introducing the basic components into said at least one chamber.

2. The device of claim 1, wherein rotational speed of the mixing screw is at least 8000 revolutions per minute, and wherein the end diameter of the mixing screw in front of the nozzle is between 6 and 15 millimeters.

3. The device of claim 2, wherein the rotational speed of the screw does not exceed 30,000 revolutions per minute.

4. The device of claim 2, wherein the clearance between the inner surface of the at least one chamber of the casing and the crest of the helical profile of the mixing screw is between 0.08 and 0.3 millimeters.

5. The device of claim 2, wherein the helical profile of the mixing screw is of the multi-thread type with two or more parallel valleys which are arranged symmetrically with respect to the axis of rotation.

6. The device of claim 1, wherein said metering valves comprise injection needles which interact with the radial openings or channels and which are operated in an adjustable manner by respective solenoids to obtain values of flowrate of resultant mixture ranging between 0.05 and 8 grammes.

7. The device of claim 1, the radial clearance is defined as a gap between the ring and said one end of casing.

8. The device of claim 7, wherein the gap connects the openings and the front clearance.

9. The device of claim 1, wherein adjustment in position of the ring along the axis of rotation of the mixing screw varies size of the front clearance.

10. The device of claim 9, wherein adjustment in position of the ring along the axis of rotation of the mixing screw correspondingly varies pressure of pressurized air through the front clearance.

* * * * *